US012619112B2

(12) United States Patent
Yao et al.

(10) Patent No.: US 12,619,112 B2
(45) Date of Patent: May 5, 2026

(54) LIQUID CRYSTAL DISPLAY PANEL AND DISPLAY DEVICE

(71) Applicants: Fuzhou BOE Optoelectronics Technology Co., Ltd., Fuzhou (CN); BOE Technology Group Co., Ltd., Beijing (CN)

(72) Inventors: Liqing Yao, Beijing (CN); Tao Fang, Beijing (CN); Hongyu Zhao, Beijing (CN)

(73) Assignees: Fuzhou BOE Optoelectronics Technologies Co., Ltd., Fuzhou (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/702,588

(22) PCT Filed: Apr. 27, 2023

(86) PCT No.: PCT/CN2023/091335
§ 371 (c)(1),
(2) Date: Apr. 18, 2024

(87) PCT Pub. No.: WO2023/208144
PCT Pub. Date: Nov. 2, 2023

(65) Prior Publication Data
US 2025/0284160 A1 Sep. 11, 2025

(30) Foreign Application Priority Data
Apr. 28, 2022 (CN) .......................... 202221037937.2

(51) Int. Cl.
*G02F 1/13363* (2006.01)
*G02F 1/1335* (2006.01)

(52) U.S. Cl.
CPC .... *G02F 1/13363* (2013.01); *G02F 1/133528* (2013.01); *G02F 1/133531* (2021.01)

(58) Field of Classification Search
CPC ........................ G02F 1/13363; G02F 1/133528
See application file for complete search history.

(56) References Cited

U.S. PATENT DOCUMENTS

| | | | |
|---|---|---|---|
| 2005/0140900 A1* | 6/2005 | Jeon .................. | G02F 1/133634 349/117 |
| 2022/0107534 A1* | 4/2022 | Hayashi .................. | G02B 5/30 |

FOREIGN PATENT DOCUMENTS

| | | | | |
|---|---|---|---|---|
| CN | 1777834 | A | 5/2006 | |
| CN | 1860404 | A | 11/2006 | |
| CN | 101960343 | A | 1/2011 | |
| CN | 106597730 | A | 4/2017 | |
| CN | 212061693 | U | 12/2020 | |
| CN | 217639869 | U | 10/2022 | |
| KR | 20170068861 | A * | 6/2017 | .......... G02B 5/3083 |
| WO | WO-2020080197 | A1 * | 4/2020 | .............. G02B 5/30 |
| WO | WO-2021069432 | A1 * | 4/2021 | ....... G02F 1/133617 |

* cited by examiner

*Primary Examiner* — Mariceli Santiago
(74) *Attorney, Agent, or Firm* — IPro, PLLC

(57) ABSTRACT

Provided is a liquid crystal display panel. The liquid crystal display panel includes a liquid crystal layer, two polarizing layers and two laminated viewing angle compensation films. The two polarizing layers are respectively disposed on two sides of the liquid crystal layer, and the two viewing angle compensation films are disposed between one of the polarizing layers and the liquid crystal layer.

20 Claims, 10 Drawing Sheets

20 m1

+C

+A 22
242
241
24
21
23 m2

20

20 m1

20 m1

20 m1 m2

LIQUID CRYSTAL DISPLAY PANEL AND DISPLAY DEVICE

CORRS-REFERENCE TO RELATED APPLICATION

The present disclosure a U.S. national stage of international application No. PCT/CN2023/091335, field on Apr. 27, 2023, which claims priority to Chinese Patent Application No. 202221037937.2, filed on Apr. 28, 2022 and entitled "LIQUID CRYSTAL DISPLAY PANEL AND DISPLAY DEVICE", the entire contents of which are herein incorporated by reference.

TECHNICAL FIELD

The present disclosure relates to the field of display technologies, and in particular, relates to a liquid crystal display panel and a display device.

BACKGROUND

A liquid crystal display panel is a display panel widely used at present, which has the advantages of high illumination, low power consumption, low cost, low manufacturing difficulty and the like.

SUMMARY

Embodiments of the present disclosure provide a display panel and a display device. The technical solutions are as follows.

According to the embodiments of the present disclosure, a liquid crystal display panel is provided. The liquid crystal display panel includes:

a liquid crystal layer, two polarizing layers and two laminated viewing angle compensation films: wherein the two polarizing layers are respectively disposed on two sides of the liquid crystal layer, and the two viewing angle compensation films are disposed between one of the polarizing layers and the liquid crystal layer.

In some embodiments, the two viewing angle compensation films include a +A compensation film and a +C compensation film laminated sequentially along a direction away from the liquid crystal layer.

In some embodiments, the liquid crystal display panel has a light exiting surface and a back surface opposite to the light exiting surface, wherein the first polarizing layer of the two polarizing layers is disposed on a side of the liquid crystal layer close to the light exiting surface, and the second polarizing layer of the two polarizing layers is disposed on a side of the liquid crystal layer close to the back surface:

an alignment direction of the liquid crystal layer is parallel to a light absorption axis of the second polarizing layer of the two polarizing layers, and the two viewing angle compensation films are disposed between the liquid crystal layer and the first polarizing layer.

In some embodiments, the liquid crystal display panel includes a liquid crystal cell, wherein the liquid crystal cell includes two substrates and the liquid crystal layer, and the liquid crystal layer is disposed between the two substrates:

at least one of the two viewing angle compensation films is disposed in a substrate of the two substrates that is close to the light exiting surface.

In some embodiments, the liquid crystal display panel includes a first polarizer, wherein the first polarizer includes the first polarizing layer and the two viewing angle compensation films, and the two viewing angle compensation films are disposed on a side of the first polarizing layer close to the liquid crystal layer.

In some embodiments, the liquid crystal display panel includes a first polarizer, wherein the first polarizer includes the first polarizing layer and one of the two viewing angle compensation films, and the two viewing angle compensation films are disposed on a side of the first polarizing layer close to the liquid crystal layer.

In some embodiments, the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface:

an alignment direction of the liquid crystal layer is parallel to a light absorption axis of the second polarizing layer of the two polarizing layers, and the two viewing angle compensation films are disposed between the liquid crystal layer and the second polarizing layer.

In some embodiments, the liquid crystal display panel includes a liquid crystal cell, wherein the liquid crystal cell includes two substrates and the liquid crystal layer, and the liquid crystal layer is disposed between the two substrates:

at least one of the two viewing angle compensation films is disposed in a substrate of the two substrates that is close to the back surface.

In some embodiments, the liquid crystal display panel includes a second polarizer, wherein the second polarizer includes the second polarizing layer and at least one of the two viewing angle compensation films, and the two viewing angle compensation films are disposed on a side of the second polarizing layer close to the liquid crystal layer.

In some embodiments, the two viewing angle compensation films include a –C compensation film and a +B compensation film laminated sequentially along a direction away from the liquid crystal layer.

In some embodiments, the two viewing angle compensation films include a +B compensation film and a –B compensation film laminated sequentially along a direction away from the liquid crystal layer.

According to the embodiments of the present disclosure, a display device is provided. The display device includes a backlight source and a liquid crystal display panel, the liquid crystal display panel including a liquid crystal layer, two polarizing layers and two laminated viewing angle compensation films: wherein the two polarizing layers are respectively disposed on two sides of the liquid crystal layer, and the two viewing angle compensation films are disposed between one of the polarizing layers and the liquid crystal layer.

In some embodiments, the backlight source includes a base substrate and a plurality of light-emitting units, wherein the plurality of light-emitting units are arranged in an array on the base substrate.

In some embodiments, the two viewing angle compensation films include a +A compensation film and a +C compensation film laminated sequentially along a direction away from the liquid crystal layer.

In some embodiments, the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface:

an alignment direction of the liquid crystal layer is parallel to a light absorption axis of the second polarizing layer, and the two viewing angle compensation films are disposed between the liquid crystal layer and the first polarizing layer.

In some embodiments, the liquid crystal display panel includes a liquid crystal cell, wherein the liquid crystal cell includes two substrates and the liquid crystal layer, and the liquid crystal layer is disposed between the two substrates:

at least one of the two viewing angle compensation films is disposed in a substrate of the two substrates that is close to the light exiting surface.

In some embodiments, the liquid crystal display panel includes a first polarizer, wherein the first polarizer includes the first polarizing layer and the two viewing angle compensation films, and the two viewing angle compensation films are disposed on a side of the first polarizing layer close to the liquid crystal layer.

In some embodiments, the liquid crystal display panel includes a first polarizer, wherein the first polarizer includes the first polarizing layer and one of the two viewing angle compensation films, and the two viewing angle compensation films are disposed on a side of the first polarizing layer close to the liquid crystal layer.

In some embodiments, the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface:

an alignment direction of the liquid crystal layer is parallel to a light absorption axis of the second polarizing layer, and the two viewing angle compensation films are disposed between the liquid crystal layer and the second polarizing layer.

In some embodiments, the liquid crystal display panel includes a liquid crystal cell, wherein the liquid crystal cell includes two substrates the liquid crystal layer, and the liquid crystal layer is disposed between the two substrates:

at least one of the two viewing angle compensation films is disposed in a substrate of the two substrates that is close to the back surface.

BRIEF DESCRIPTION OF DRAWINGS

For clearer descriptions of the technical solutions in the embodiments of the present disclosure, the following briefly introduces the accompanying drawings required for describing the embodiments. The accompanying drawings in the following descriptions show merely some embodiments of the present disclosure, and persons of ordinary skill in the art may still derive other drawings from these accompanying drawings without creative effort.

Specific embodiments of the present disclosure have been shown by the above accompanying drawings and will be described in detail hereinafter. The accompanying drawings and textual descriptions are not intended to limit the scope of the concept of the present disclosure in any way, but rather illustrate the concept of the present disclosure for those skilled in the art with reference to particular embodiments.

DETAILED DESCRIPTION

To make the objectives, technical solutions and advantages of the present disclosure clearer, the embodiments of the present disclosure will be further described in detail below with reference to the accompanying drawings.

Figure 1:
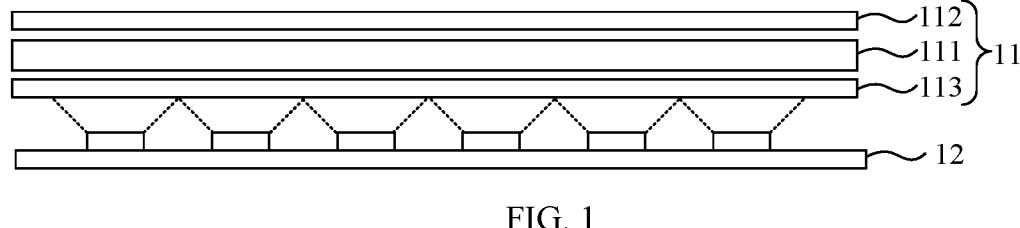
FIG. 1 is a schematic structural diagram of a display device to which a liquid crystal display panel is applied.

A liquid crystal display panel is a display panel widely used at present. FIG. 1 is a schematic structural diagram of a display device to which a liquid crystal display panel is applied. Referring to FIG. 1, the display device further includes a backlight assembly 12 disposed at a backside of the liquid crystal display panel 11, and the backlight assembly 12 is configured to provide a light source for the liquid crystal display panel 11.

The liquid crystal display panel 11 includes a liquid crystal layer 111 and two polarizers (112, 113) disposed on two sides of the liquid crystal layer 111, and the directions of the light-absorbing axes of the two polarizers (112, 113) are perpendicular to each other. The polarizer close to the backlight assembly 12 is a lower polarizer 113, and the polarizer away from the backlight assembly 12 is an upper polarizer 112.

Under such a structure, the light emitted from the backlight assembly 12 irradiates the lower polarizer 113, and the light penetrating through the lower polarizer and irradiating the liquid crystal layer 111 is polarized light whose polarization direction is perpendicular to the direction of the light absorption axis of the lower polarizer. In the case that the liquid crystal layer 111 does not adjust the polarization direction of the polarized light, when the polarized light irradiates the upper polarizer 112, the polarized light is generally blocked by the upper polarizer 112 and cannot be emitted out of the liquid crystal display panel because the polarization direction of the polarized light is parallel to the light absorption axis of the upper polarizer 112. The liquid crystal layer 111 may control the polarization direction of light under control, and the polarization direction of some polarized light penetrating through some regions of the liquid crystal layer is shifted by 90 degrees such that the polarization direction of this part of polarized light is perpendicular to the light absorption axis of the upper polarizer 112. Therefore, when this part of the polarized light irradiates the upper polarizer 112, this part of the polarized light can penetrate through the upper polarizer 112 and can be emitted out of the liquid crystal display panel, because the polarization direction of this part of polarized light is perpendicular to the light absorption axis of the upper polarizer 112.

Figure 2:
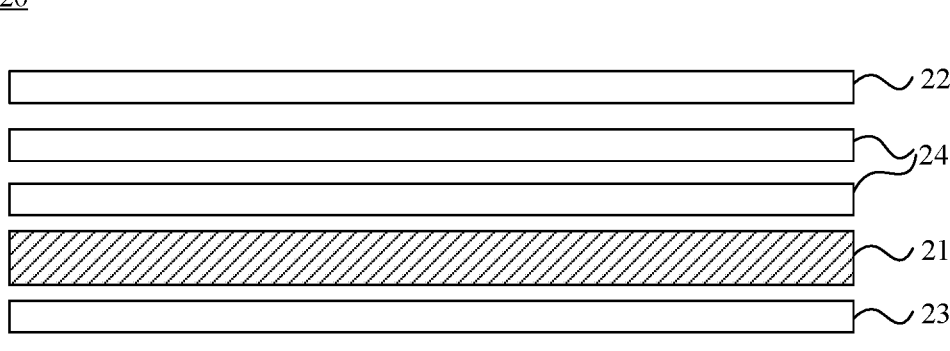
FIG. 2 is a schematic structural diagram of a liquid crystal display panel according to some embodiments of the present disclosure.

FIG. 2 is a schematic structural diagram of a liquid crystal display panel according to some embodiments of the present disclosure. The liquid crystal display panel 20 includes: a liquid crystal layer 21, two polarizing layers (a first polarizing layer 22, a second polarizing layer 23), and two laminated viewing angle compensation films 24. The two polarizing layers (the first polarizing layer 22, the second polarizing layer 23) are respectively disposed on two sides of the liquid crystal layer 21, and the two viewing angle compensation films 24 are disposed between one of the two polarizing layers (the first polarizing layer 22, the second polarizing layer 23) and the liquid crystal layer 21.

FIG. 2 illustrates a structure in which the two viewing angle compensation films 24 are disposed between the first polarizing layer 22 and the liquid crystal layer 21, but the two viewing angle compensation films 24 may also be disposed between the second polarizing layer 23 and the liquid crystal layer 21, which is not limited in the embodiments of the present disclosure.

In summary, the embodiments of the present disclosure provide a liquid crystal display panel, and the liquid crystal display panel includes a liquid crystal layer, two polarizing layers, and two viewing angle compensation films. By providing the two viewing angle compensation films between either of the two polarizing layers and the liquid crystal layer, the light leakage caused by the big viewing angle of the liquid crystal display panel is reduced, and the visible angle of the liquid crystal display panel is compensated, which solves the problem of the poor display effect of the liquid crystal display panel due to light leakage in the related art and improves the display effect of the liquid crystal display panel.

Figure 3:
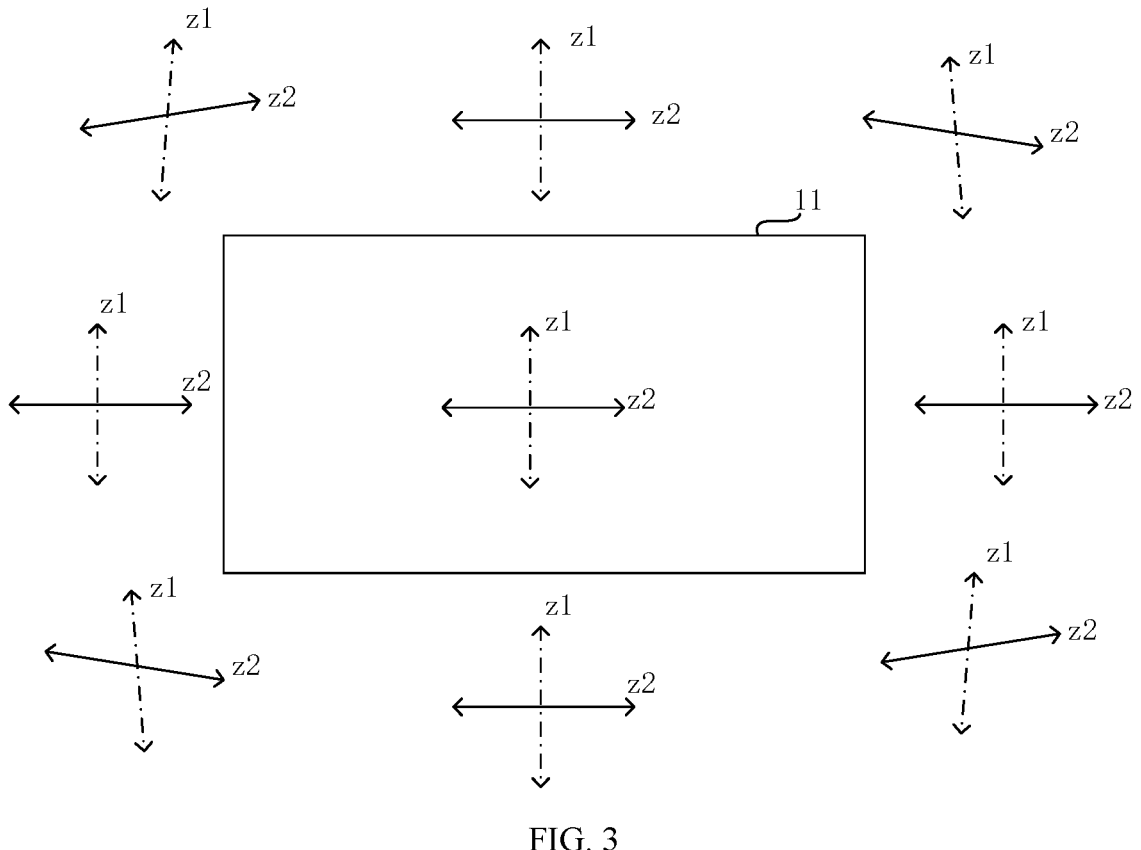
FIG. 3 is a schematic diagram of a light absorption axis of a polarizer in the display device shown in FIG. 1.
Figure 4:
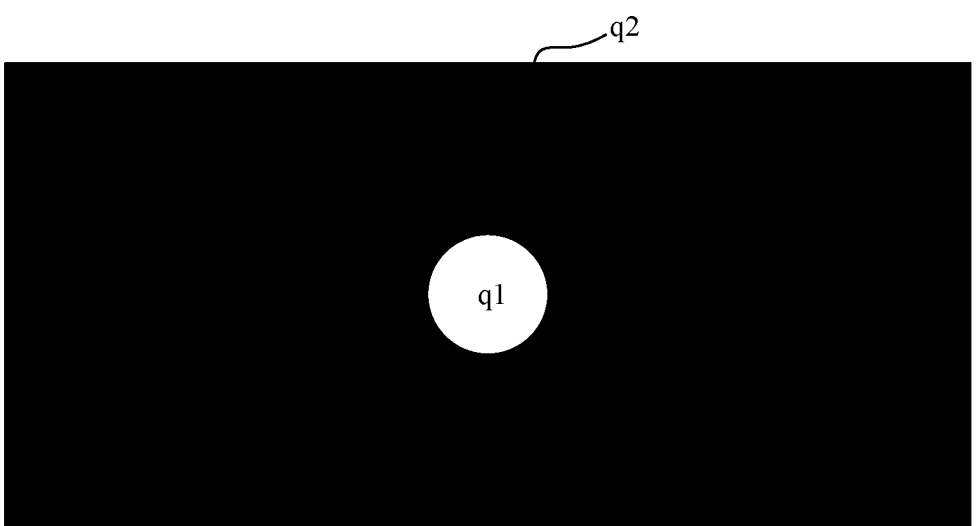
FIG. 4 is a viewing schematic diagram of a display screen of a display device.
Figure 5:
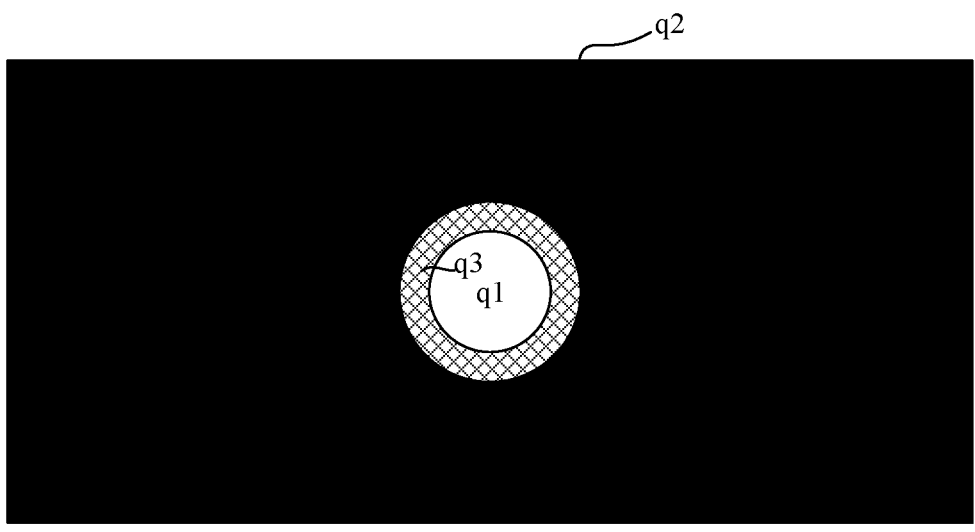
FIG. 5 is another viewing schematic diagram of a display screen of a display device.

It should be noted that when a user views the liquid crystal display panel at certain bigger viewing angles, the polarization direction of the light passing through the lower polarizer is not parallel to the light absorption axis of the upper polarizer, that is, the light absorption axis of the lower polarizer and the light absorption axis of the upper polarizer are not perpendicular to each other when the user views the liquid crystal display panel at certain bigger viewing angles. For example, please refer to FIG. 3, FIG. 3 is a schematic diagram of the light absorption axis of the polarizer in the display device shown in FIG. 1, FIG. 3 shows a schematic structural diagram of the light absorption axis z1 of the lower polarizer and the light absorption axis 22 of the upper polarizer when the liquid crystal display panel 11 is viewed at various viewing angles. It can be seen that at a viewing angle directly facing the liquid crystal display panel 11, the light absorption axis z1 of the lower polarizer and the light absorption axis 22 of the upper polarizer are perpendicular to each other, but at the viewing angles from the four corners, the light absorption axis z1 of the lower polarizer and the light absorption axis z2 of the upper polarizer are not perpendicular to each other. As a result, when the liquid crystal display panel 11 is viewed from the viewing angles from the four corners, it is difficult for the liquid crystal display panel 11 to control light precisely, resulting in light leakage. This problem is more serious when a light-emitting region is surrounded by a dark-colored region in the display screen. For example, as shown in FIG. 4 which is a viewing schematic diagram of a display screen of a display device, the display screen includes a light-emitting region q1 and a dark-colored region q2 surrounding the light-emitting region q1. FIG. 4 is a schematic diagram when the display device is viewed from the front, and it can be seen that the boundary between the light-emitting region q1 and the dark-colored region q2 is clear, and basically there is no light leakage. As shown in FIG. 5 which is another viewing schematic diagram of a display screen of the display device, the display screen includes a light-emitting region q1 and a dark-colored region q2 surrounding the light-emitting region q1. FIG. 5 is a schematic diagram when the display device is viewed from the side, and it can be seen that there exists a certain halo region q3 at the boundary between the light-emitting region q1 and the dark-colored region q2 (the halo region q3 is only schematic and does not represent an actual effect). This phenomenon is referred to as a halo effect. The display effect of the liquid crystal panel is greatly affected.

Figure 6:
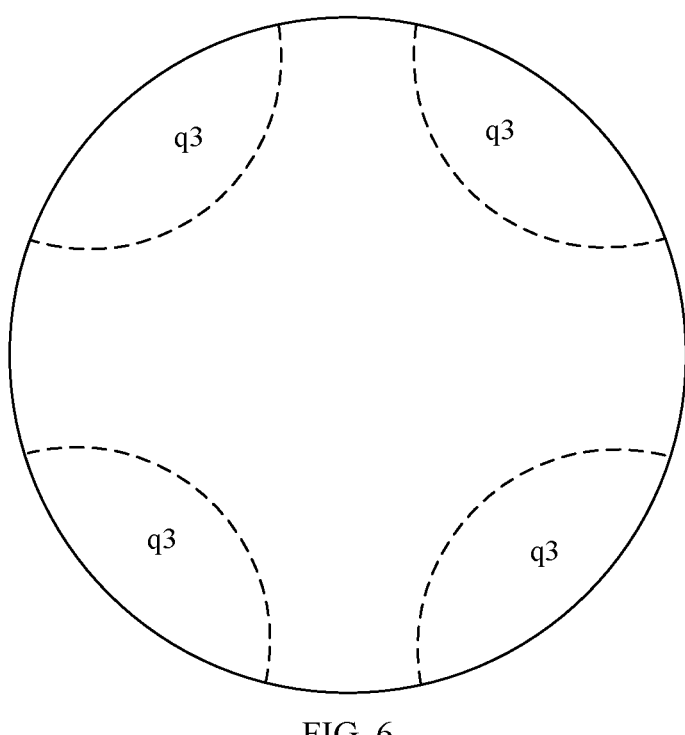
FIG. 6 is a diagram showing a simulation effect of light leakage of the display device shown in FIG. 1.

In the case that the backlight assembly of the display device is a mini light-emitting diode (Mini LED) backlight assembly, the halo effect is more serious due to the large divergence angle of the Mini LED. For example, as shown in FIG. 6 which shows a simulation effect of light leakage of the display device shown in FIG. 1, the circular region represents the light leakages at various viewing angles. The light leakage region q3 is a region where light leakage may exist, and the larger the light leakage region q3 is, the more serious the light leakage is. As can be seen, the light leakage regions q3 are located at four corners, and it represents that the light leakage is more serious when the liquid crystal display panel is viewed from the upper-left, lower-left, upper-right, and lower-right directions of the liquid crystal display panel.

However, in the liquid crystal display panel provided in the embodiments of the present disclosure, two viewing angle compensation films are provided in the liquid crystal display panel, which can overcome the problem in the related art.

Figure 7:
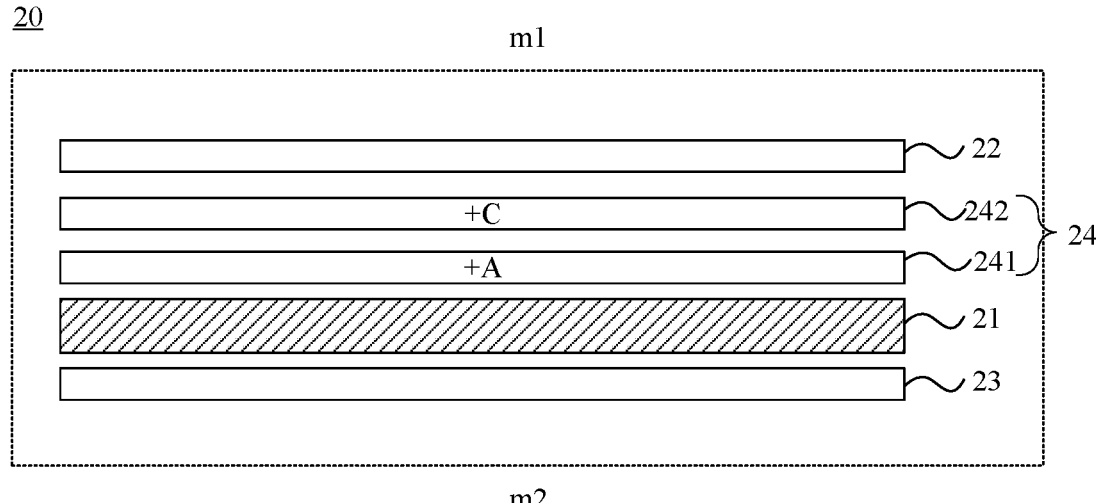
FIG. 7 is a schematic structural diagram of another liquid crystal display panel according to some embodiments of the present disclosure.

FIG. 7 is a schematic structural diagram of another liquid crystal display panel according to some embodiments of the present disclosure. The liquid crystal display panel 20 has a light exiting surface m1 and a back surface m2 opposite to the light exiting surface. The first polarizing layer 22 is disposed on the side of the liquid crystal layer 21 close to the light exiting surface m1, and the second polarizing layer 23 is disposed on the side of the liquid crystal layer 21 close to the back surface m2.

The alignment direction of the liquid crystal layer 21 is parallel to the light absorption axis of the second polarizing layer 23. Under such a structure, the liquid crystal display panel is an O-mode liquid crystal display panel, and the two viewing angle compensation films 24 are disposed between the liquid crystal layer 21 and the first polarizing layer 22. Under this structure, the improvement effect of the two viewing angle compensation films 24 on the light leakage can be enhanced.

It is to be noted that in the embodiments of the present disclosure, the light exiting surface m1 is the surface of the outermost film layer at the side of the liquid crystal display panel which is configured to display images, and the back surface m2 is the surface of the film layer closest to the backlight assembly at the side of the liquid crystal display panel which is configured to receive light from the backlight component.

In some embodiments, the two viewing angle compensation films include a +A compensation film 241 and a +C compensation film 242 sequentially laminated along the direction away from the liquid crystal layer 21.

Light enters a medium from a vacuum, and the retardation degree of the speed of light in the medium relative to the speed of light in the vacuum can be described by the refractive index: $n=c/v$, wherein n represents the refractive index of the medium, c represents the speed of light in the vacuum, and v represents the speed of light in the medium. The refractive indexes of light in three directions of x, y and z are defined as nx, ny and nz, respectively. For an isotropic medium, the refractive indexes of light in the three directions of x, y and z are the same, i.e., $nx=ny=nz$; and for an anisotropic medium, the refractive indexes of light in the three directions are not the same. The compensation films involved in the embodiments of the present disclosure are anisotropic media. Specifically, the compensation films involved in the embodiments of the present disclosure are shown in Table 1.

TABLE 1

| Type of compensation film | refractive index |
| --- | --- |
| +A | nx > ny = nz |
| +C | nz > nx = ny |
| +B | nz > nx > ny |
| −B | nx > ny > nz |
| −C | nx = ny > nz |
| Z | nx > nz > ny |

Table 1 illustrates the refractive index parameters of six compensation films, i.e., +A compensation film, +C compensation film, +B compensation film, −B compensation film, −C compensation film, and Z compensation film.

As shown in FIG. 7, in the liquid crystal display panel 20, the +A compensation film 241 and the +C compensation film 242 are disposed between the liquid crystal layer 21 and the first polarizing layer 22, and are laminated sequentially in the direction away from the liquid crystal layer 21. In this structure, the area of the light leakage region q3 in the light leakage simulation effect diagram is smaller.

Figure 8:
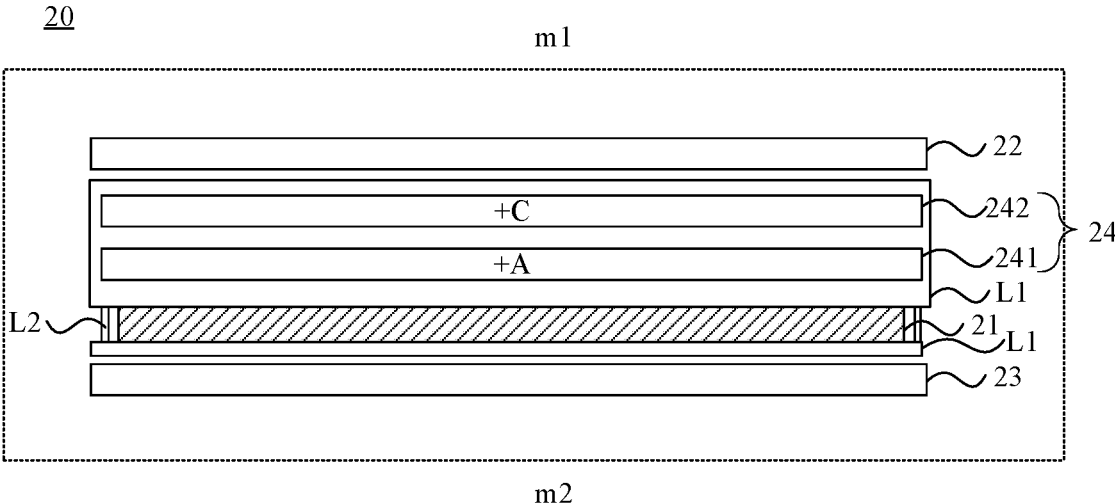
FIG. 8 is a schematic structural diagram of another liquid crystal display panel according to some embodiments of the present disclosure.

The +A compensation film 241 and the +C compensation film 242 shown in FIG. 7 are two independent film layers, and the two compensation films may also be provided in other structures. For example, as shown in FIG. 8, which is a schematic structural diagram of another liquid crystal display panel according to some embodiments of the present disclosure, the liquid crystal display panel includes a liquid crystal cell, and the liquid crystal cell includes two substrates L1, a barrier wall L2 and a liquid crystal layer 21. The liquid crystal layer 21 and the barrier wall L2 are disposed between the two substrates L1, and the barrier wall L2 surrounds the liquid crystal layer 21 and is connected to the two substrates L1.

At least one of the two viewing angle compensation films (241 and 242) is disposed in the substrate L1 of the two substrates L1 that is close to the light exiting surface m1.

Figure 9:
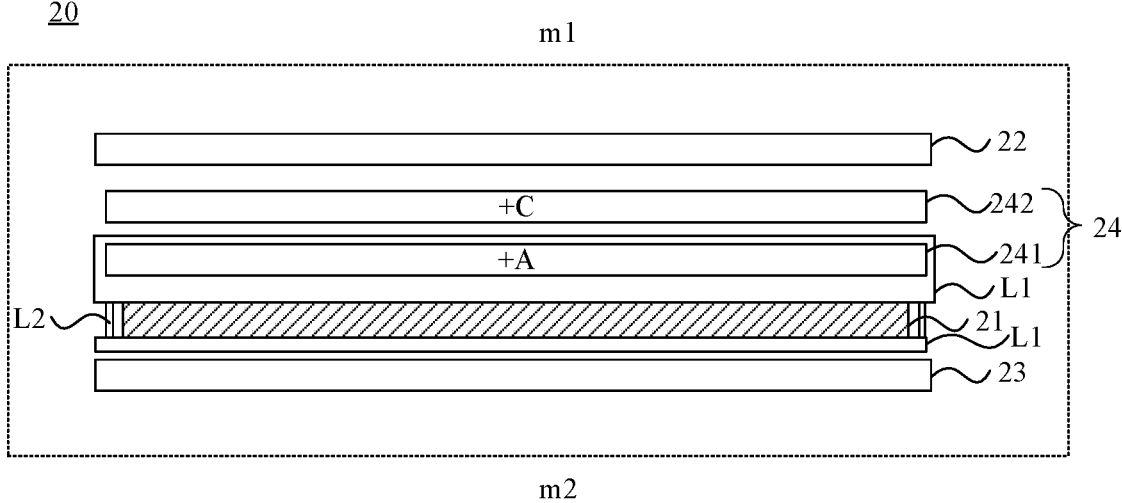
FIG. 9 is a schematic structural diagram of another liquid crystal display panel according to some embodiments of the present disclosure.

It should be noted that the substrate L1 of the liquid crystal cell is a multilayer substrate, and the two viewing angle compensation films (241 and 242) are provided in the multilayer substrate. FIG. 8 illustrates a structure in which the +A compensation film 241 and the +C compensation film 242 are provided in the substrate L1 of the liquid crystal cell, and the liquid crystal display panel provided in the embodiments of the present disclosure may also be of other structure. For example, please refer to FIG. 9, and FIG. 9 is a schematic structural diagram of another liquid crystal display panel according to the embodiments of the present disclosure. The liquid crystal display panel includes a liquid crystal cell, and the liquid crystal cell includes two substrates L1, a barrier wall L2 and a liquid crystal layer 21. The liquid crystal layer 21 and the barrier wall L2 are disposed between the two substrates L1, and the barrier wall L2 surrounds the liquid crystal layer 21 and is connected to the two substrates L1.

One viewing angle compensation film (+A compensation film 241) of the two viewing angle compensation films (241 and 242) is disposed in the substrate L1 of the two substrates L1 that is close to the light exiting surface m1.

The substrate L1 of the liquid crystal cell is a multilayer substrate, and the +A compensation film 241 is provided in the multilayer substrate.

Figure 10:
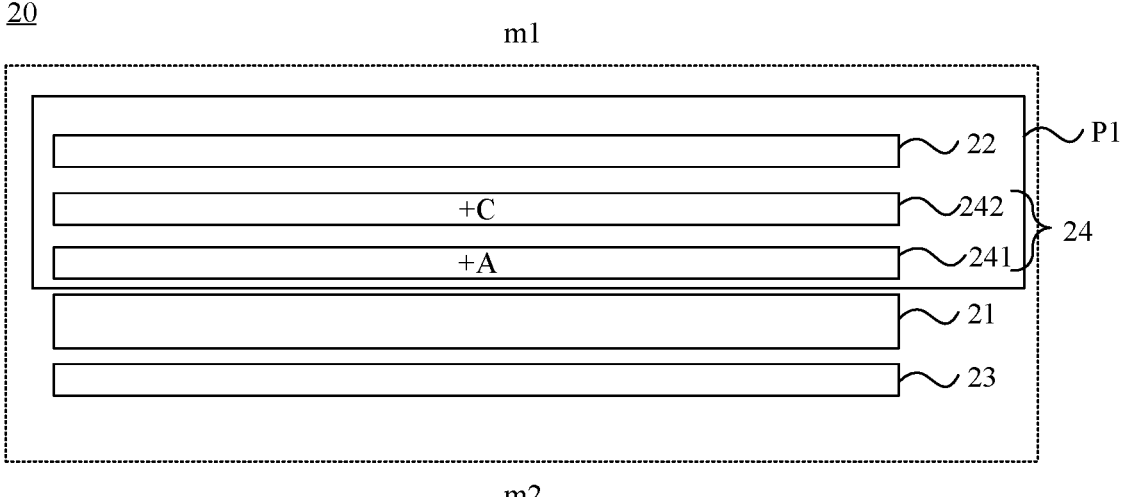
FIG. 10 is a schematic structural diagram of another liquid crystal display panel according to some embodiments of the present disclosure.

In addition, in the embodiments of the present disclosure, the viewing angle compensation film may also be provided in other structures. For example, please refer to FIG. 10, and FIG. 10 is a schematic structural diagram of another liquid crystal display panel according to some embodiments of the present disclosure. The liquid crystal display panel includes a first polarizer P1, and the first polarizer P1 includes a first polarizing layer 22 and two viewing angle compensation films (241 and 242). The two viewing angle compensation films (241 and 242) are disposed on the side of the first polarizing layer 22 close to the liquid crystal layer 21.

The first polarizer P1 is a composite film layer, and the two viewing angle compensation films (241 and 242) are provided in the composite film layer.

Figure 11:
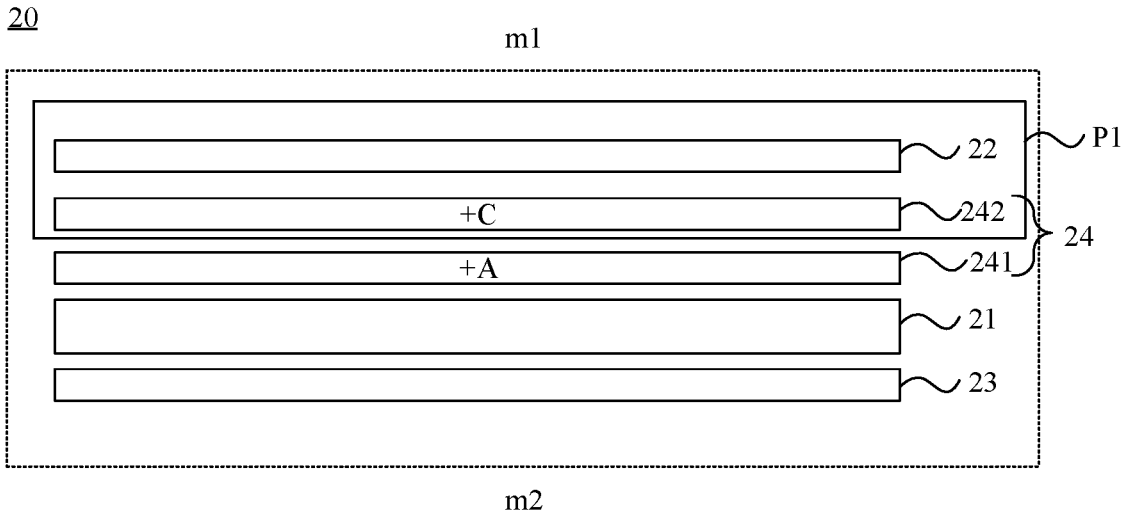
FIG. 11 is a schematic structural diagram of another liquid crystal display panel according to some embodiments of the present disclosure.

Referring to FIG. 11, FIG. 11 is a schematic structural diagram of another liquid crystal display panel according to some embodiments of the present disclosure. The liquid crystal display panel includes a first polarizer P1, and the first polarizer P1 includes a first polarizing layer 22 and one viewing angle compensation film (+C compensation film 242). The two viewing angle compensation films (241 and 242) are disposed on the side of the first polarizing layer 22 close to the liquid crystal layer 21.

The first polarizer P1 is a composite film layer, and the +C compensation film 242 is provided in the composite film layer.

Figure 12:
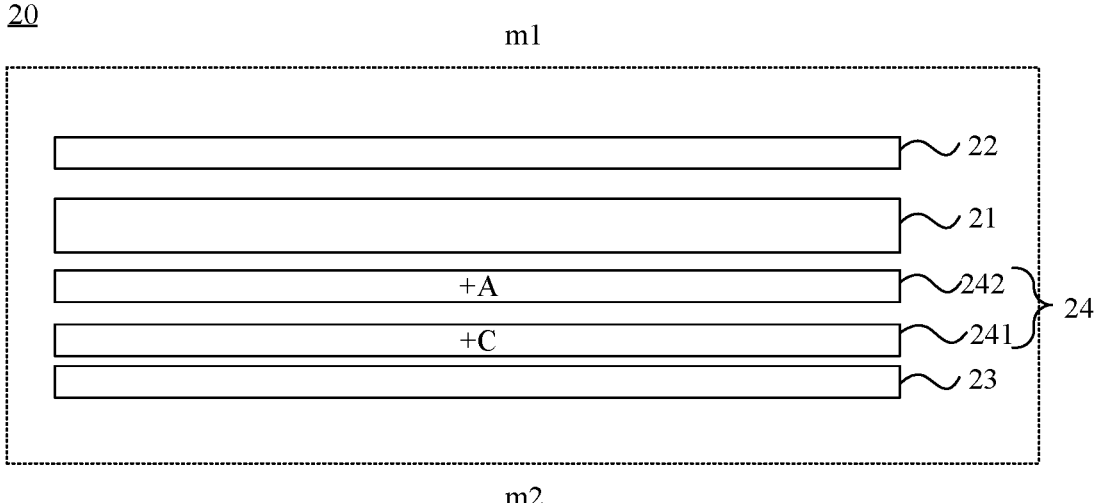
FIG. 12 is a schematic structural diagram of another liquid crystal display panel according to some embodiments of the present disclosure.

In FIG. 7 to FIG. 11, the two viewing angle compensation films are disposed between the liquid crystal layer and the first polarizing layer, but the two viewing angle compensation films may also be disposed at other positions. For example, referring to FIG. 12, FIG. 12 is a schematic structural diagram of another liquid crystal display panel according to some embodiments of the present disclosure. The liquid crystal display panel 21 has a light exiting surface m1 and a back surface m2 opposite to the light exiting surface, the first polarizing layer 22 is disposed on the side of the liquid crystal layer 21 close to the light exiting surface m1, and the second polarizing layer 23 is disposed on the side of the liquid crystal layer 21 close to the back surface m2.

The alignment direction of the liquid crystal layer 21 is perpendicular to the light absorption axis of the second polarizing layer 23, and the two viewing angle compensation films (241 and 242) are disposed between the liquid crystal layer 21 and the second polarizing layer 23.

The two viewing angle compensation films include a +A compensation film and a +C compensation film which are laminated sequentially along the direction away from the liquid crystal layer 21.

Figure 13:
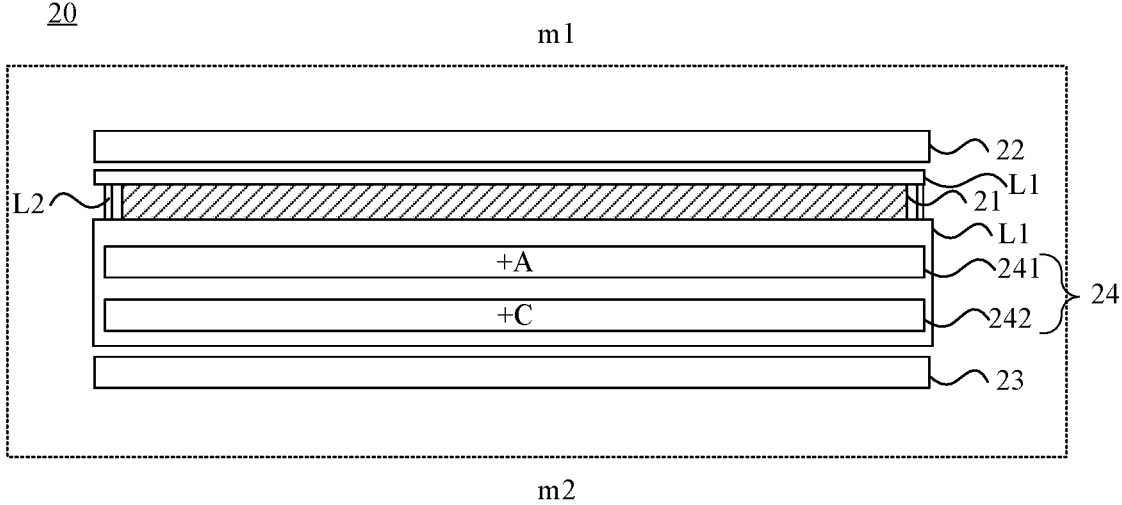
FIG. 13 is a schematic structural diagram of another liquid crystal display panel according to some embodiments of the present disclosure.

FIG. 12 illustrates a structure in which the +A compensation film 241 and the +C compensation film 242 are two independent film layers, but the two compensation films may also be provided in other structures. For example, as shown in FIG. 13, which is a schematic structural diagram of another liquid crystal display panel according to some embodiments of the present disclosure, the liquid crystal display panel includes a liquid crystal cell, and the liquid crystal cell includes two substrates L1, a barrier wall L2, and a liquid crystal layer 21. The liquid crystal layer 21 and the barrier wall L2 are disposed between the two substrates L1, and the barrier wall L2 surrounds the liquid crystal layer 21 and is connected to the two substrates L1.

At least one of the two viewing angle compensation films (241 and 242) is disposed in one of the two substrates L1 that is close to the back surface m2. The substrate L1 is a composite film layer, and the two viewing angle compensation films (241 and 242) are provided in the composite film layer.

Figure 14:
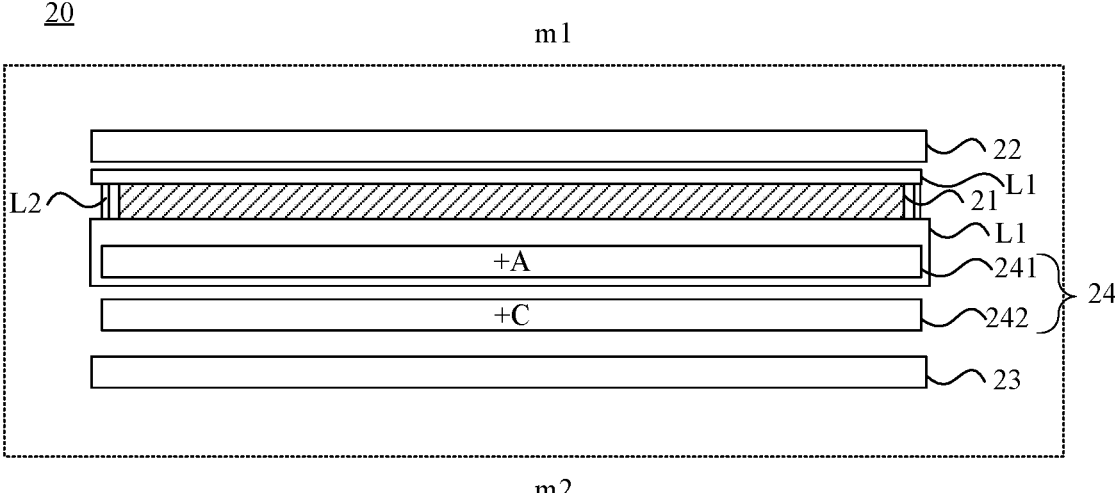
FIG. 14 is a schematic structural diagram of another liquid crystal display panel according to some embodiments of the present disclosure.

FIG. 13 illustrates a structure in which the two viewing angle compensation films (241 and 242) are both disposed in the substrate L1 of the two substrates L1 that is close to the back surface m2, but the liquid crystal display panel provided in the embodiments of the present disclosure may also be of other structures. For example, please refer to FIG. 14, and FIG. 14 is a schematic structural diagram of another liquid crystal display panel according to some embodiments of the present disclosure. The liquid crystal display panel includes a liquid crystal cell, and the liquid crystal cell includes two substrates L1, a barrier wall L2, and a liquid crystal layer 21. The liquid crystal layer 21 and the barrier wall L2 are disposed between the two substrates L1, and the barrier wall L2 surrounds the liquid crystal layer 21 and is connected to the two substrates L1.

One viewing angle compensation film (+A compensation film 241) of the two viewing angle compensation films (241 and 242) is disposed in the substrate L1 of the two substrates L1 that is close to the back surface m2.

The substrate L1 of the liquid crystal cell is a multilayer substrate, and the +A compensation film 241 is provided in the multilayer substrate.

Figure 15:
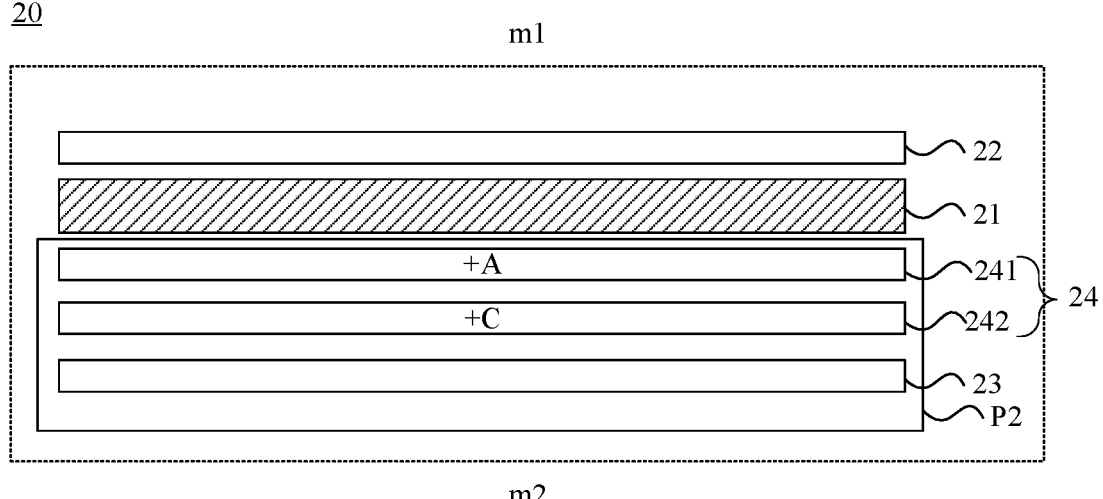
FIG. 15 is a schematic structural diagram of another liquid crystal display panel according to some embodiments of the present disclosure.

Furthermore, in the embodiments of the present disclosure, the viewing angle compensation films may also be provided in other structures. For example, please refer to FIG. 15, and FIG. 15 is a schematic structural diagram of another liquid crystal display panel according to some embodiments of the present disclosure. The liquid crystal display panel includes a second polarizer P2, and the second polarizer P2 includes a second polarizing layer 23 and two view angle compensation films (241 and 242). The two view angle compensation films (241 and 242) are disposed on the side of the second polarizing layer 23 close to the liquid crystal layer 21.

The second polarizer P2 is a composite film layer, and the two viewing angle compensation films (241 and 242) are provided in the composite film layer.

Figure 16:
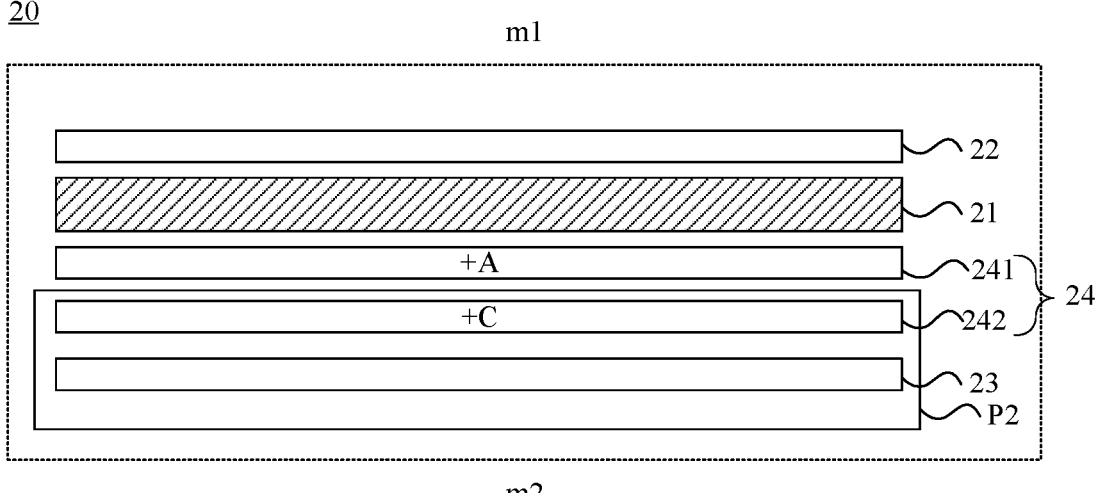
FIG. 16 is a schematic structural diagram of another liquid crystal display panel according to some embodiments of the present disclosure.

Referring to FIG. 16, FIG. 16 is a schematic structural diagram of another liquid crystal display panel according to some embodiments of the present disclosure. The liquid crystal display panel includes a second polarizer P2, and the second polarizer P2 includes a second polarizing layer 23 and one viewing angle compensation film (+C compensation film 242). The two viewing angle compensation films (241 and 242) are disposed on the side of the second polarizing layer 23 close to the liquid crystal layer 21.

The second polarizer P2 is a composite film layer, and the +C compensation film 242 is provided in the composite film layer.

Figure 17:
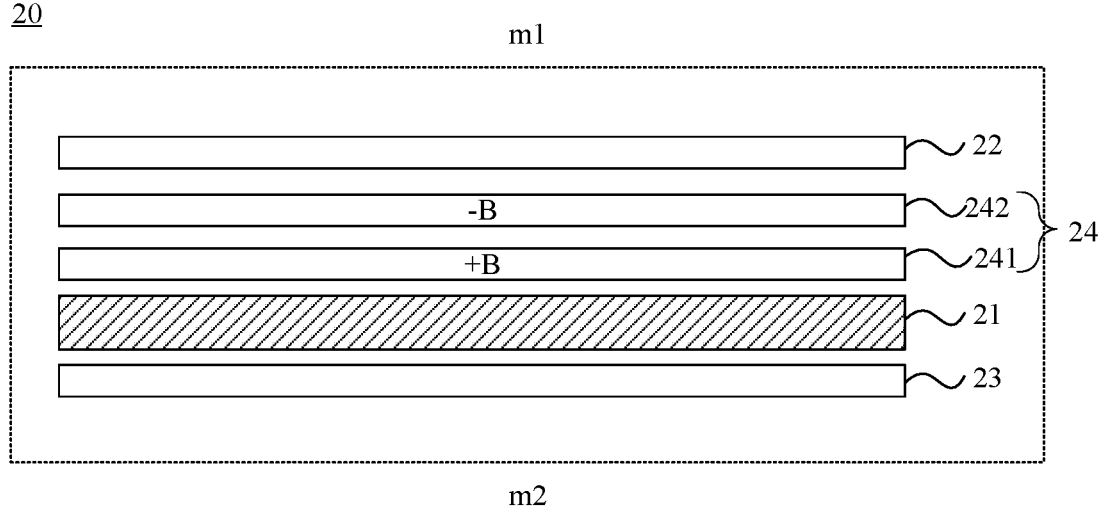
FIG. 17 is a schematic structural diagram of another liquid crystal display panel according to some embodiments of the present disclosure.

Furthermore, in the liquid crystal display panel provided in the embodiments of the present disclosure, the two compensation films may be of other structures. For example, referring to FIG. 17. FIG. 17 is a schematic structural diagram of another liquid crystal display panel according to some embodiments of the present disclosure. The two viewing angle compensation films include a +B compensation film and a −B compensation film laminated sequentially along the direction away from the liquid crystal layer. The liquid crystal display panel is an O mode liquid crystal display panel.

Figure 18:
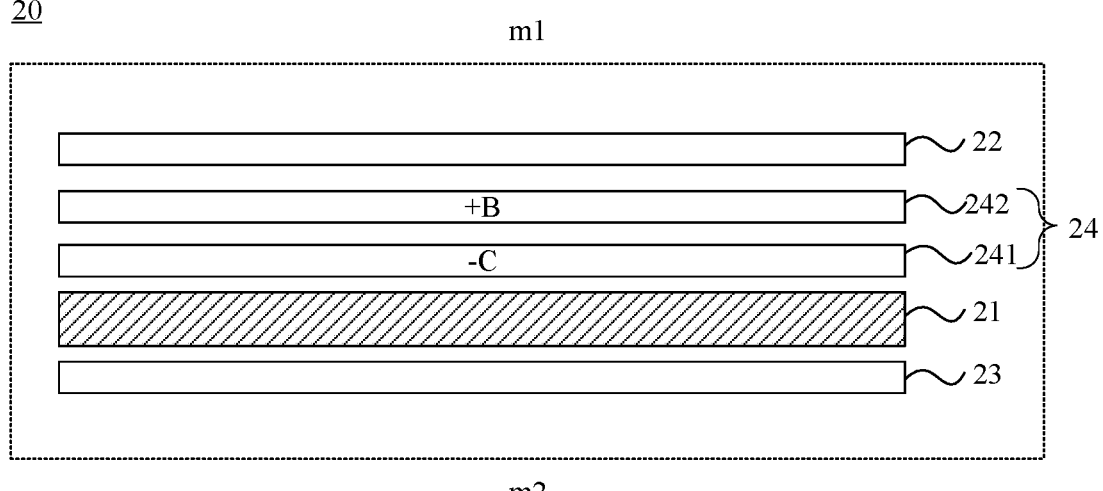
FIG. 18 is a schematic structural diagram of another liquid crystal display panel according to some embodiments of the present disclosure.

Referring to FIG. 18. FIG. 18 is a schematic structural diagram of another liquid crystal display panel according to some embodiments of the present disclosure. The two viewing angle compensation films include a −C compensation film and a +B compensation film laminated sequentially along the direction away from the liquid crystal layer. The liquid crystal display panel is an O mode liquid crystal display panel.

Figure 19:
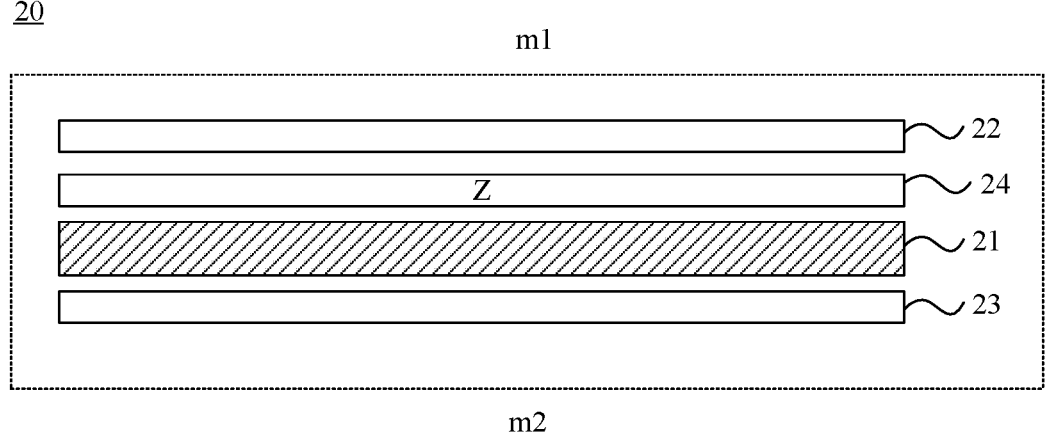
FIG. 19 is a schematic structural diagram of another liquid crystal display panel according to some embodiments of the present disclosure.

Furthermore, in the liquid crystal display panel provided in the embodiments of the present disclosure, the viewing angle compensation film may also be a compensation film with a dual optical axis. Referring to FIG. 19, FIG. 19 is a schematic structural diagram of another liquid crystal display panel according to some embodiments of the present disclosure. The viewing angle compensation film includes a Z compensation film. The liquid crystal display panel is an O mode liquid crystal display panel.

The liquid crystal display panel provided in the embodiments of the present disclosure may be a planar panel or a curved panel.

Furthermore, the optical retardation amounts of the compensation films have different effects on the improvement of light leakage. For example, for the liquid crystal display panel including the +A compensation film and the +C compensation film laminated in the direction away from the liquid crystal layer in the embodiments of the present disclosure, the optical retardation amount Rth of the +C compensation film is from −62 nanometers to −110 nanometers, and the optical retardation amount Rth of the +A compensation film is from 50 nanometers to 88 nanometers, which can reduce the light leakage amount of the liquid crystal display pane In summary, the embodiments of the present disclosure provide a liquid crystal display panel, and the liquid crystal display panel includes a liquid crystal layer, two polarizing layers, and two viewing angle compensation films. By providing the two viewing angle compensation films between either of the two polarizing layers and the liquid crystal layer, the light leakage caused by the big viewing angle of the liquid crystal display panel is reduced, and the visible angle of the liquid crystal display panel is compensated, which solves the problem of the poor display effect of the liquid crystal display panel due to light leakage in the related art and improves the display effect of the liquid crystal display panel.

For some liquid crystal display panels provided in the embodiments of the present disclosure, the light leakage is shown in Table 2:

TABLE 2

| Structure | Maximum light leakage ratio |
| --- | --- |
| LCD O-mode | 100% |
| +C +A LCD O-mode | 5.4% |
| +C +A LCD E-mode | 49.2% |
| LCD +A +C O-mode | 37.5% |
| LCD +A +C E-mode | 7.9% |
| +A +C LCD O-mode | 104.8% |
| +C (+A LCD) O-mode | 5.4% |
| (+C +A LCD) O-mode | 5.4% |
| +B −C LCD O-mode | 6.4% |
| Z LCD O-mode | 23.4% |
| −B +B LCD O-mode | 6.3% |
| Curved LCD O-mode | 98.9% |
| +C +A curved LCD O-mode | 7.3% |

Table 2 above shows the ratios of the light leakage amounts of the liquid crystal display panels provided with the viewing angle compensation films of different structures to the light leakage amount of the reference sample by taking that the light leakage amount of a liquid crystal display panel without the viewing angle compensation film (LCD O-mode) is 100% as a reference sample. The LCD represents the liquid crystal layer, and +C, +A, +B, −B, and Z represent the viewing angle compensation films. The viewing angle compensation film being on the left side of the LCD represents that the viewing angle compensation film is disposed on the side of the liquid crystal layer close to the display surface, the viewing angle compensation film being on the left side of the LCD represents that the viewing angle compensation film is disposed on the side of the liquid crystal layer close to the back surface, and the viewing angle compensation film and the LCD being inside the parenthesis "( )" represents that the viewing angle compensation film is provided in the liquid crystal cell. As can be seen from Table 2, compared with the liquid crystal display panel without the view angle compensation film, the light leakage amount can be reduced by 75% to 90% in the liquid crystal display panels provided in the embodiments of the present disclosure.

Figure 20:
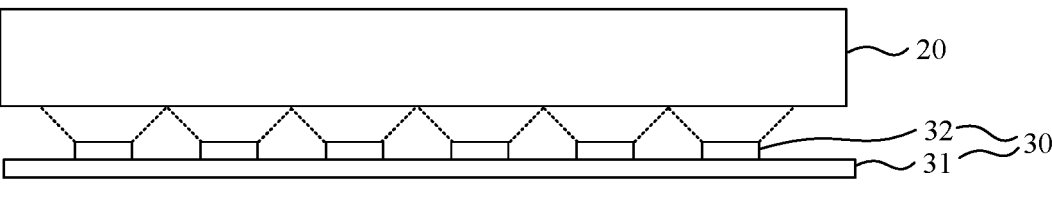
FIG. 20 is a schematic structural diagram of a display device according to some embodiments of the present disclosure.

Furthermore, as shown in FIG. 20, FIG. 20 is a schematic structural diagram of a display device according to some embodiments of the present disclosure. The display device includes a backlight source 30 and any one of the liquid crystal display panels 20 provided in the above embodiments.

In some embodiments, the backlight source 30 includes a base substrate 31 and a plurality of light-emitting units 32, and the plurality of light-emitting units 32 are arranged in an array on the base substrate 31. The light-emitting units 32 are Mini LEDs.

In summary, the embodiments of the present disclosure provide a display device. The liquid crystal display panel in the display device includes a liquid crystal layer, two polarizing layers, and two viewing angle compensation films. By providing the two viewing angle compensation films between either of the two polarizing layers and the liquid crystal layer, the light leakage caused by the big viewing angle of the liquid crystal display panel is reduced, and the visible angle of the liquid crystal display panel is compensated, which solves the problem of the poor display effect of the liquid crystal display panel due to light leakage in the related art and improves the display effect of the liquid crystal display panel.

It should be noted that in the drawings, the dimensions of layers and regions may be exaggerated for clarity of illustration. It is to be further understood that when an element or layer is referred to as being "on" another element or layer, it may be directly on other elements, or an intermediate layer may be present. Additionally, it is to be understood that when an element or layer is referred to as being "under" another element or layer, it may be directly under other elements, or more than one intermediate layer or element may be present. Additionally, it is to be understood that when a layer or element is referred to as being "between" two layers or two elements, it may be the unique layer between the two layers or two elements, or more than one intermediate layer or element may be present. Similar reference numerals indicate similar elements throughout.

In the present disclosure, the terms "first" and "second" are used for descriptive purposes only and are not to be understood as indicating or implying relative importance. The term "a plurality of" refers to two or more, unless otherwise expressly limited.

Described above are merely optional embodiments of the present disclosure, and are not intended to limit the present disclosure. Within the spirit and principles of the disclosure, any modifications, equivalent substitutions, improvements, and the like are within the protection scope of the present disclosure.

The invention claimed is:

1. A liquid crystal display panel, comprising: a liquid crystal layer, two polarizing layers and two laminated viewing angle compensation films; wherein the two polarizing layers are respectively disposed on two sides of the liquid crystal layer, and the two viewing angle compensation films are disposed between one of the polarizing layers and the liquid crystal layer, wherein the two viewing angle compensation films comprise a +A compensation film and a +C compensation film laminated sequentially along a direction away from the liquid crystal layer, wherein the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface;

an alignment direction of the liquid crystal layer is parallel to a light absorption axis of the second polarizing layer, and the two viewing angle compensation films are disposed between the liquid crystal layer and the first polarizing layer.

2. The liquid crystal display panel according to claim 1, comprising a liquid crystal cell, wherein the liquid crystal cell comprises two substrates and the liquid crystal layer, and the liquid crystal layer is disposed between the two substrates;

at least one of the two viewing angle compensation films is disposed in a substrate of the two substrates that is close to the light exiting surface.

3. The liquid crystal display panel according to claim 1, comprising a first polarizer, wherein the first polarizer comprises the first polarizing layer and the two viewing angle compensation films, and the two viewing angle compensation films are disposed on a side of the first polarizing layer close to the liquid crystal layer.

4. The liquid crystal display panel according to claim 1, comprising a first polarizer, wherein the first polarizer comprises the first polarizing layer and one of the two viewing angle compensation films, and the two viewing angle compensation films are disposed on a side of the first polarizing layer close to the liquid crystal layer.

5. The liquid crystal display panel according to claim 1, wherein the liquid crystal display panel consists of exactly two laminated viewing angle compensation films.

6. A liquid crystal display panel, comprising: a liquid crystal layer, two polarizing layers and two laminated viewing angle compensation films; wherein the two polarizing layers are respectively disposed on two sides of the liquid crystal layer, and the two viewing angle compensation films are disposed between one of the polarizing layers and the liquid crystal layer, wherein the two viewing angle compensation films comprise a-C compensation film and a +B compensation film laminated sequentially along a direction away from the liquid crystal layer.

7. The liquid crystal display panel according to claim 6, wherein the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface;

an alignment direction of the liquid crystal layer is parallel to a light absorption axis of the second polarizing layer, and the two viewing angle compensation films are disposed between the liquid crystal layer and the first polarizing layer.

8. The liquid crystal display panel according to claim 7, comprising a liquid crystal cell, wherein the liquid crystal cell comprises two substrates and the liquid crystal layer, and the liquid crystal layer is disposed between the two substrates;

at least one of the two viewing angle compensation films is disposed in a substrate of the two substrates that is close to the light exiting surface.

9. The liquid crystal display panel according to claim 7, comprising a first polarizer, wherein the first polarizer comprises the first polarizing layer and the two viewing angle compensation films, and the two viewing angle compensation films are disposed on a side of the first polarizing layer close to the liquid crystal layer.

10. The liquid crystal display panel according to claim 7, comprising a first polarizer, wherein the first polarizer comprises the first polarizing layer and one of the two viewing angle compensation films, and the two viewing angle compensation films are disposed on a side of the first polarizing layer close to the liquid crystal layer.

11. The liquid crystal display panel according to claim 6, wherein the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface;

an alignment direction of the liquid crystal layer is parallel to a light absorption axis of the second polarizing layer, and the two viewing angle compensation films are disposed between the liquid crystal layer and the second polarizing layer.

12. The liquid crystal display panel according to claim 11, comprising a liquid crystal cell, wherein the liquid crystal cell comprises two substrates and the liquid crystal layer, and the liquid crystal layer is disposed between the two substrates;

at least one of the two viewing angle compensation films is disposed in a substrate of the two substrates that is close to the back surface.

13. The liquid crystal display panel according to claim 11, comprising a second polarizer, wherein the second polarizer comprises the second polarizing layer and at least one of the two viewing angle compensation films, and the two viewing angle compensation films are disposed on a side of the second polarizing layer close to the liquid crystal layer.

14. A liquid crystal display panel, comprising: a liquid crystal layer, two polarizing layers and two laminated viewing angle compensation films; wherein the two polarizing layers are respectively disposed on two sides of the liquid crystal layer, and the two viewing angle compensation films are disposed between one of the polarizing layers and the liquid crystal layer, wherein the two viewing angle compensation films comprise a +B compensation film and a-B compensation film laminated sequentially along a direction away from the liquid crystal layer, wherein the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface;

an alignment direction of the liquid crystal layer is parallel to a light absorption axis of the second polarizing layer, and the two viewing angle compensation films are disposed between the liquid crystal layer and the first polarizing layer, or the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface;

an alignment direction of the liquid crystal layer is parallel to a light absorption axis of the second polarizing layer, and the two viewing angle compensation films are disposed between the liquid crystal layer and the second polarizing layer.

15. The liquid crystal display panel according to claim 14, in response to the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface, an alignment direction of the liquid crystal layer is parallel to a light absorption axis of the second polarizing layer, and the two viewing angle compensation films are disposed between the liquid crystal layer and the first polarizing layer:

the liquid crystal display panel comprising a liquid crystal cell, wherein the liquid crystal cell comprises two substrates and the liquid crystal layer, and the liquid crystal layer is disposed between the two substrates;

at least one of the two viewing angle compensation films is disposed in a substrate of the two substrates that is close to the light exiting surface.

16. The liquid crystal display panel according to claim 14, in response to the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface, an alignment direction of the liquid crystal layer is parallel to a light absorption axis of the second polarizing layer, and the two viewing angle compensation films are disposed between the liquid crystal layer and the first polarizing layer:

the liquid crystal display panel comprising a first polarizer, wherein the first polarizer comprises the first polarizing layer and the two viewing angle compensation films, and the two viewing angle compensation films are disposed on a side of the first polarizing layer close to the liquid crystal layer.

17. The liquid crystal display panel according to claim 14, in response to the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface, an alignment direction of the liquid crystal layer is parallel to a light absorption axis of the second polarizing layer, and the two viewing angle compensation films are disposed between the liquid crystal layer and the first polarizing layer:

the liquid crystal display panel comprising a first polarizer, wherein the first polarizer comprises the first polarizing layer and one of the two viewing angle compensation films, and the two viewing angle compensation films are disposed on a side of the first polarizing layer close to the liquid crystal layer.

18. The liquid crystal display panel according to claim 14, in response to the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface, an alignment direction of the liquid crystal layer is parallel to a light absorption axis of the second polarizing layer, and the two viewing angle compensation films are disposed between the liquid crystal layer and the second polarizing layer:

the liquid crystal display panel comprising a liquid crystal cell, wherein the liquid crystal cell comprises two substrates and the liquid crystal layer, and the liquid crystal layer is disposed between the two substrates;

at least one of the two viewing angle compensation films is disposed in a substrate of the two substrates that is close to the back surface.

19. The liquid crystal display panel according to claim 14, in response to the liquid crystal display panel has a light exiting surface and a back surface opposite to the light exiting surface, wherein a first polarizing layer of the two polarizing layers is disposed on a side of the liquid crystal layer close to the light exiting surface, and a second polarizing layer of the two polarizing layers is disposed on a side of the liquid crystal layer close to the back surface, an alignment direction of the liquid crystal layer is parallel to a light absorption axis of the second polarizing layer, and the two viewing angle compensation films are disposed between the liquid crystal layer and the second polarizing layer:

the liquid crystal display panel comprising a second polarizer, wherein the second polarizer comprises the second polarizing layer and at least one of the two viewing angle compensation films, and the two viewing angle compensation films are disposed on a side of the second polarizing layer close to the liquid crystal layer.

20. The liquid crystal display panel according to claim 14, wherein the liquid crystal display panel consists of exactly two laminated viewing angle compensation films.

\* \* \* \* \*